(12) United States Patent
Gilbert et al.

(10) Patent No.: US 10,813,281 B2
(45) Date of Patent: Oct. 27, 2020

(54) APPARATUS, SYSTEMS AND METHODS FOR APPLYING FLUID

(71) Applicant: Ag Leader Technology, Ames, IA (US)

(72) Inventors: Douglas Gilbert, Ames, IA (US); Ron Farrington, Nevada, IA (US); John Howard, Ames, IA (US)

(73) Assignee: Ag Leader Technology, Ames, IA (US)

( * ) Notice: Subject to any disclaimer, the term of this patent is extended or adjusted under 35 U.S.C. 154(b) by 0 days.

(21) Appl. No.: 16/280,572

(22) Filed: Feb. 20, 2019

(65) Prior Publication Data

US 2019/0254225 A1 Aug. 22, 2019

Related U.S. Application Data

(60) Provisional application No. 62/632,866, filed on Feb. 20, 2018, provisional application No. 62/632,836, filed on Feb. 20, 2018.

(51) Int. Cl.
| | | |
|---|---|---|
| *A01C 23/00* | (2006.01) | |
| *A01C 15/00* | (2006.01) | |
| *A01M 7/00* | (2006.01) | |
| *F04B 49/00* | (2006.01) | |
| *A01C 7/06* | (2006.01) | |
| *A01C 7/04* | (2006.01) | |

(52) U.S. Cl.
CPC .......... *A01C 23/007* (2013.01); *A01C 15/005* (2013.01); *A01M 7/0089* (2013.01); *A01C 7/04* (2013.01); *A01C 7/06* (2013.01); *F04B 49/00* (2013.01)

(58) Field of Classification Search
CPC .......... A01C 7/04; A01C 7/06; A01C 15/005; A01C 23/007; A01M 7/005; A01M 7/0089; F04B 49/00
See application file for complete search history.

(56) References Cited

U.S. PATENT DOCUMENTS

| | | | |
|---|---|---|---|
| 4,949,656 A | 8/1990 | Lyle et al. | |
| 4,986,782 A | 1/1991 | Severtson | |
| 5,069,779 A | 12/1991 | Brown et al. | |
| 6,003,455 A * | 12/1999 | Flamme | A01C 23/007 111/200 |
| 2006/0086295 A1* | 4/2006 | Jensen | A01C 7/00 111/118 |
| 2013/0126430 A1 | 5/2013 | Kenley et al. | |
| 2013/0333601 A1* | 12/2013 | Shivak | A01C 7/04 111/118 |
| 2016/0007524 A1 | 1/2016 | Kusler et al. | |
| 2017/0013771 A1 | 1/2017 | Townsend | |
| 2018/0015490 A1 | 1/2018 | Grimm et al. | |
| 2018/0368310 A1* | 12/2018 | Zimmerman | A01C 23/002 |

FOREIGN PATENT DOCUMENTS

WO 2017160860 A1 9/2017

\* cited by examiner

*Primary Examiner* — Darren W Gorman
(74) *Attorney, Agent, or Firm* — Davis, Brown, Koehn, Shors & Roberts, P.C.; Matthew Warner-Blankenship

(57) ABSTRACT

The disclosed apparatus, systems and methods relate to fluid distribution systems. The fluid distribution systems being made up of a plurality of positive displacement pumps disposed on a fluid distribution manifold and proximate to the tank and the point of product discharge. The system optionally has a valve system for precision control of fluid discharge.

16 Claims, 13 Drawing Sheets

APPARATUS, SYSTEMS AND METHODS FOR APPLYING FLUID

CROSS-REFERENCE TO RELATED APPLICATION(S)

This application claims priority to U.S. Provisional Application Nos. 62/632,866 and 62/632,836, both filed Feb. 20, 2018, which are hereby incorporated by reference in their entirety under 35 U.S.C. § 119(e).

TECHNICAL FIELD

The disclosed technology relates generally to a liquid application system, and in particular to a liquid application system using positive displacement pumps, various methods of calibration for the system and component configurations and associated devices to enhance flow control accuracy and extend range of flow control operation.

BACKGROUND

The disclosure relates to apparatus, systems and methods for the distribution of fluids via a distributed pump arrangement.

FIGS. 1A and 1B depict traditional prior art row liquid systems. In these prior systems, the tanks are located on or near the tractor. It is understood that by locating the tanks on a different vehicle/implement, the fluidic system requires a significant amount of plumbing to transport fluid within the system/between the pump and the rows. It is further understood that with such a fluidic system comes extra cost and chance for failure.

Additionally, these prior systems typically utilize a flow meter that is continually monitored and a product regulating valve that is continually adjusted to achieve a desired application rate. Prior art systems have utilized a throttling valve and/or flow meter on each row unit to control the application of flow to individual rows.

In the systems of FIGS. 1A and 1B, the systems utilize one main system pump which may cause the product flow rate and product pressure to drop or change at varying points along the toolbar, thereby creating an uneven distribution of fluid within the system.

There is a need in the art for improved fluid distribution systems, devices and methods.

BRIEF SUMMARY

Discussed herein are various devices, systems and methods relating to a liquid application system and associated methods and devices.

One Example includes a supply tank, a manifold in fluidic communication with the supply tank and a plurality of discharges.

Implementations according to this Example may include one or more of the following features. The system further including a high precision flow meter in fluidic communication with the supply tank. The system where the system is constructed and arranged to utilize an electronic signature to establish volumetric flow via an open loop system. The system where the electronic signature includes at least one of applied current, applied voltage, pump characteristics, the viscosity/fluid characteristics of the applied fluid, the motor characteristics and/or pump rotational speed. The system further including: a second supply tank, a second manifold in fluidic communication with the supply tank, a plurality of second discharges, and a plurality of second pumps distributed along the second manifold so as to be proximate to the plurality of second discharges, where the plurality of first and second pumps are variable speed positive displacement pumps. The system further including a switching valve system constructed and arranged for intermittent application of fluid. The system further including a calibration system.

Another Example includes a fluid distribution system for an agricultural implement, including: a tool bar, a manifold disposed along the tool bar, a plurality of pumps in fluidic communication with the manifold, and a plurality of discharges, each discharge in fluidic communication with a pump, where each pump is proximal to the discharge.

Implementations according to this Example may include one or more of the following features. The system where the plurality of pumps are positive displacement pumps. The system further including a plurality of flow meters, where each flow meter is in fluidic communication with a positive displacement pump.

One Example includes the system further including a switching valve system constructed and arranged for intermittent application of fluid.

One Example includes the system where the valve system includes: a plurality of valves, each valve in fluidic communication with a positive displacement pump and a recirculation circuit, where the recirculation circuit recirculates unused fluid back to the positive displacement pump.

Implementations according to this Example may include one or more of the following features. The system where the plurality of valves are high speed two way valves. The system where the plurality of valves are high speed three way valves.

Another Example includes a fluid distribution system including: a supply tank, a manifold, a plurality of discharges, each discharge defining a row, and a plurality of fluid control devices disposed along the manifold, each fluid control device proximal to a point of product discharge.

Implementations according to this Example may include one or more of the following features. The system where the fluid control devices are selected from the group including of positive displacement pumps and ball valves. The system where positive displacement pump speed is adjustable based on ground speed, turning radius and application rate. The system further including a flow meter in fluidic communication with each of the positive displacement pumps. The system further including a valve system constructed and arranged for intermittent applicant of fluids. The system where the valve system is modular.

Other embodiments of these Examples include corresponding computer systems, apparatus, and computer programs recorded on one or more computer storage devices, each constructed and arranged to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. Implementations of the described techniques may include hardware, a method or process, or computer software on a computer-accessible medium.

While multiple implementations are disclosed, still other implementations of the disclosure will become apparent to those skilled in the art from the following detailed description, which shows and describes illustrative implementations of the disclosed apparatus, systems and methods. As will be realized, the disclosed apparatus, systems and methods are capable of modifications in various obvious aspects, all without departing from the spirit and scope of the disclosure. Accordingly, the drawings and detailed description are to be regarded as illustrative in nature and not restrictive.

DETAILED DESCRIPTION

The various implementations disclosed or contemplated herein relate to fluid application systems and row liquid application technology. In certain implementations, an application system having multiple, distributed fluid control devices is provided. These fluid control devices may be positive displacement pumps and/or ball valves. In various implementations, each positive displacement pump is driven by a motor to precisely meter liquid flow rate to multiple discharge points across the width of an agricultural toolbar. In certain implementations, the speed of the pump is varied to turn product dispense on/off as well as control the application rate. The contemplated systems allow for individual control of each discharge point across an agricultural toolbar.

Figure 1A:
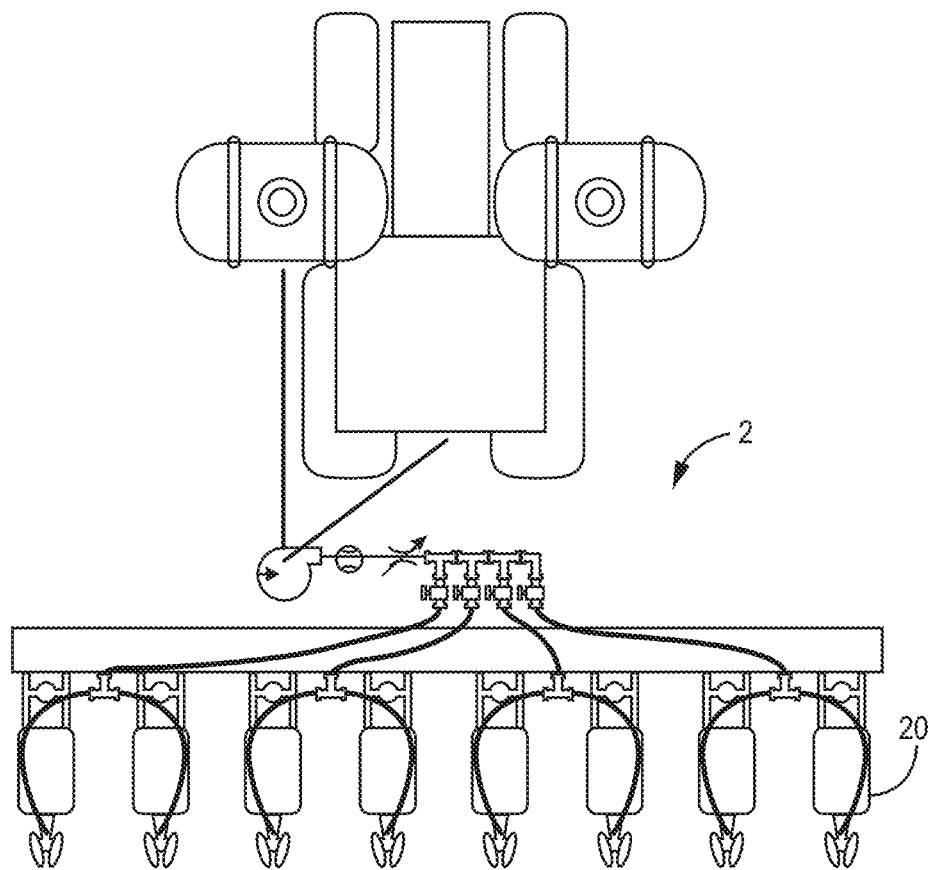
FIG. 1A is a top view of a prior art tool bar liquid system.
Figure 1B:
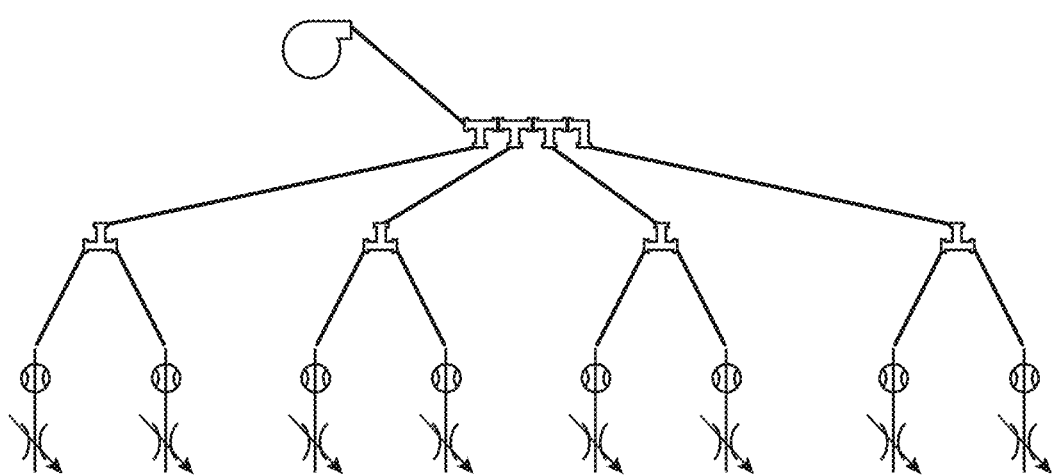
FIG. 1B is a top schematic view of a prior art row liquid system.
Figure 2:
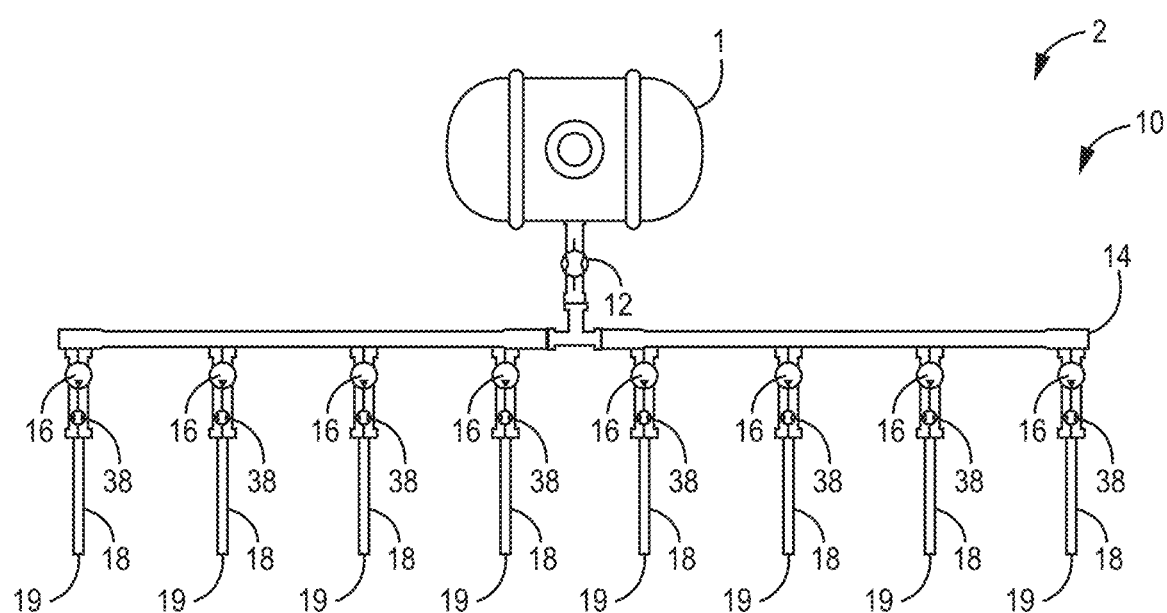
FIG. 2 is a top view of a fluid control system, according to one implementation.

One exemplary application system 10 utilizing distributed positive displacement pumps 16 and several optional components is shown in the implementation of FIG. 2. In these implementations, the system 10 has a supply tank 1 in fluidic communication with a flow meter 12 such as a high precision flow meter 12 that is in further fluidic communication with a fluid distribution manifold 14. The manifold 14 is in fluidic communication with a plurality of pumps 16 distributed across the manifold 14 as applicable for the individual implementation. For example, in certain implementations, the pumps 16 are distributed so as to be in proximate fluidic communication with individual rows and/or row units. In various implementations, the pumps 16 are variable speed positive displacement pumps 16. Various pump 16 configurations are discussed herein in relation to FIGS. 5-8 and FIGS. 14-16.

Figure 3:
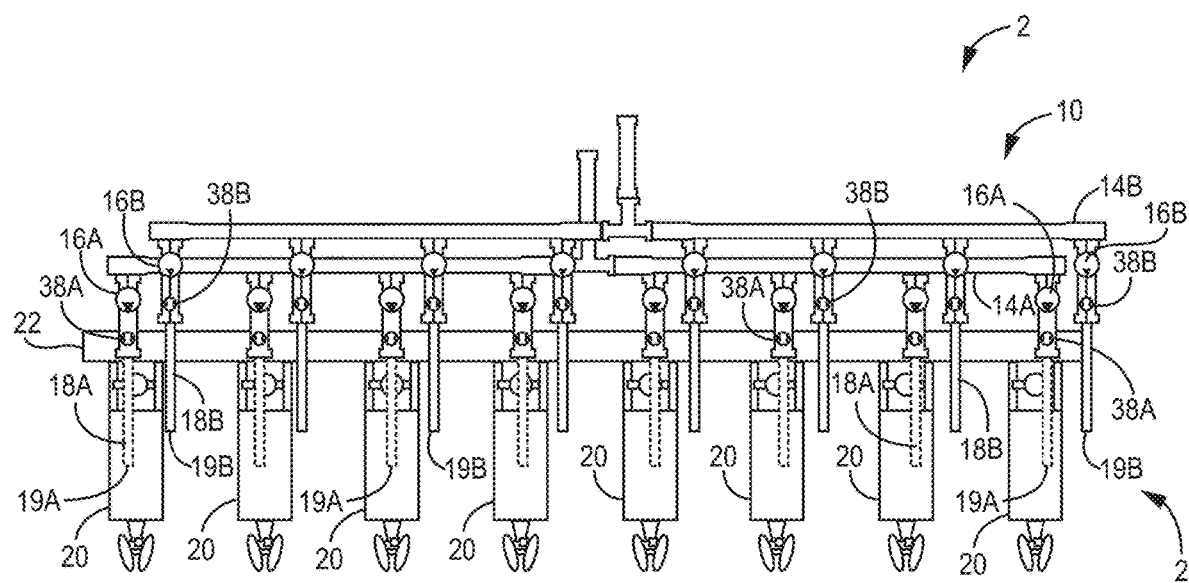
FIG. 3 is a top view of a fluid control system, according to one implementation.
Figure 4:
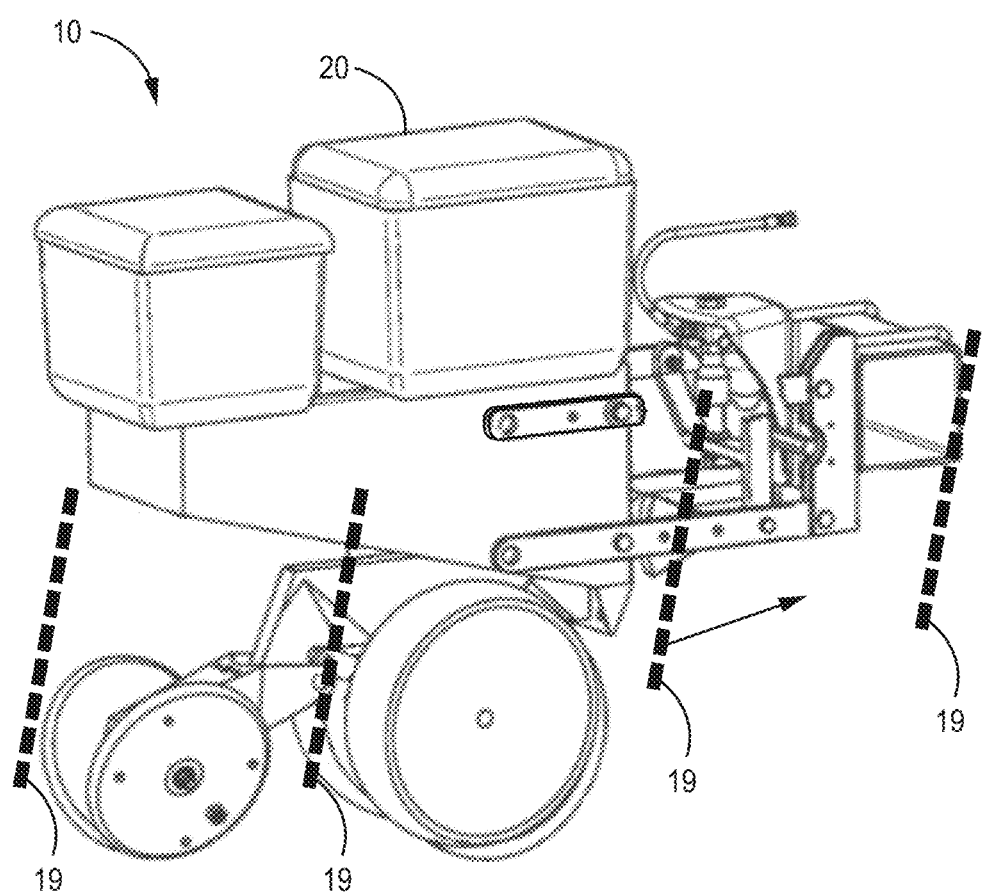
FIG. 4 is a perspective view of a row unit showing several possible discharge points, according to certain implementations.

In various implementations, the manifold 14 extends along the length of an agricultural tool bar (shown for example in FIG. 3 at 22). In certain of these implementations, positive displacement pumps 16 are disposed along the manifold 14 at various locations, such as at the connection between the toolbar 22 and each individual row unit 20 attached to the toolbar 22, other locations are possible as would be understood by those of skill in the art.

Continuing with the implementation of FIG. 2 and as also shown in the implementation of FIG. 3, the distributed pumps 16 are in turn in fluidic communication with discharges 18 constructed and arranged to apply the liquid to the field at the point of product discharge 19, as would be understood by those of skill in the art. In various implementations, any combination of liquid pesticides, fungicides, insecticides, inoculants or crop nutrients can be metered and applied. It is understood that the system 10 allows for controlled and precise application of fluids at all points along the toolbar and throughout the fluidic system.

In some implementations the supply tank 1 is mounted on the implement 2. Mounting of the supply tank 1 on the implement 2, eliminates the additional fluidic system that would have been needed in order to pump a product from a supply tank 1 mounted to a tractor or other vehicle. Simplifying and reducing the amount of fluidic system required reduces the cost of the system 10 and improves reliability.

Various implementations of the system 10 are constructed and arranged to establish the volumetric flow rate for use in regulating the discharge of fluid. In certain implementations, the pumps 16 are optionally in fluidic communication with flow meters 38, as is shown in FIGS. 2 and 3 and elsewhere. Flow meters 38 may be disposed distally from the supply tank 1 between the pump 16 and the discharge 18. These optional flow meters 38 may help to precisely regulate the amount of flow.

In alternate implementations, the system 10 is constructed and arranged to establish volumetric flow without a flow meter. Instead, the system 10 is constructed and arranged to utilize an electronic signature to establish volumetric flow. That is, in these implementations, the system 10 can be configured such that one or more pump characteristics are known or determined, some non-limiting examples of such features being current applied to the pump motor, voltage applied to the pump motor; pump characteristics such as displacement and/or volumetric efficiency/leakage; the viscosity/fluid characteristics of the applied fluid, the motor characteristics and/or pump rotational speed. It is understood that the system 10 can be configured, such as via on-board software, to be able to utilize one or more of the pump and/or fluid characteristics so as to accurately estimate the volumetric flow of the fluid. That is, for example, the system 10 can calculate or otherwise estimate the volumetric flow on the basis of user inputted information on the type of fluid when electronic signature information such as voltage and/or current or the pump rotational speed are established via the system software, which has been calibrated with information about the pump and/or fluid. In use according to this example, the end user may indicate to the system that a specific pesticide is being used, and the system 10 is configured to utilize an open-loop system on the basis of the known fluidic characteristics of that pesticide, coupled with the applied current and voltage to establish volumetric flow. Many other examples are of course possible for other implementations.

FIG. 3 depicts another implementation of the system 10 where multiple products are being applied via manifolds 14A and 14B. For example, one product may be placed in a seed furrow and the second product applied adjacent to a seed furrow. In some of these implementations, the system 10 consists of two distribution manifolds 14A, 14B. The manifolds 14A, 14B are in fluidic communication with displacement pumps 16A, 16B. The positive displacement pumps 16A, 16B are in turn in fluidic communication with discharges 18A, 18B. In alternate implementations, the positive displacement pumps 16A, 16B are in fluidic communication with flow meters 38A, 38B, which are in fluidic communication with discharges 18A, 18B.

In certain implementations, the system 10 can be used in conjunction with an implement such as a row crop planter 2. The row crop planter 2 according to these implementations comprises a plurality of row units 20 disposed on a toolbar 22. The distribution manifold 14A may distribute various fluids to the individual row units 20 via the discharges 18A, 18B. Those of skill in the art will appreciate that in these implementations, the positive displacement pump(s) 16A, 16B are in close proximity to row unit 20 and/or point of product discharge 19A, 19B.

Figure 10:
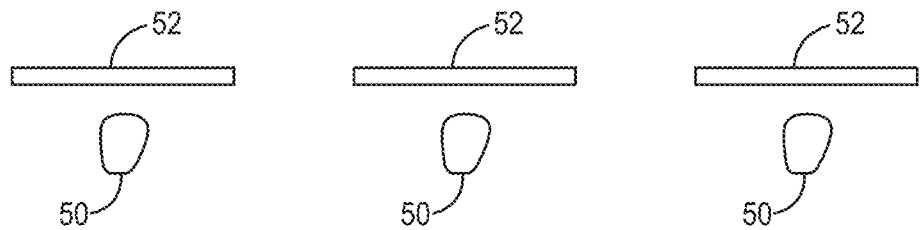
FIG. 10 is a top view of application of fluid next to seed, according to one implementation.
Figure 12:
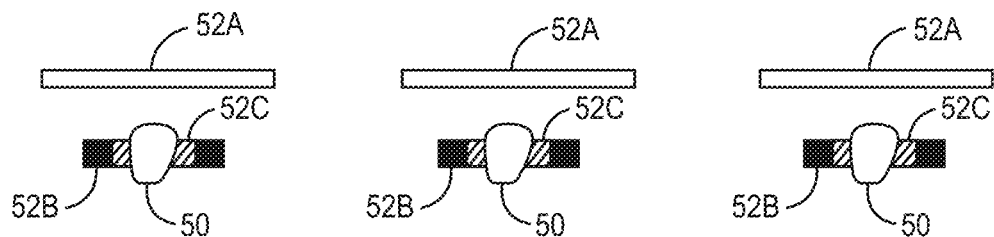
FIG. 12 is a top view of the application of a plurality of fluid to seed, according to one implementation.
Figure 13:
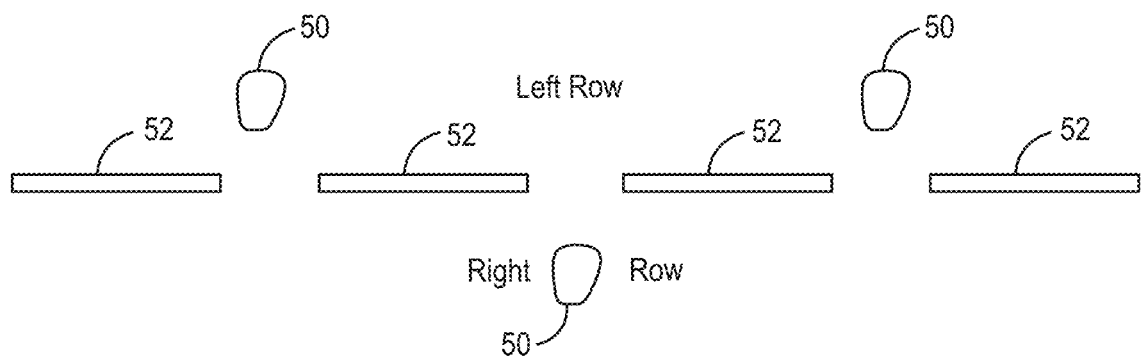
FIG. 13 is a top view of the application of fluid intermediate to rows, according to one implementation.
Figure 14:
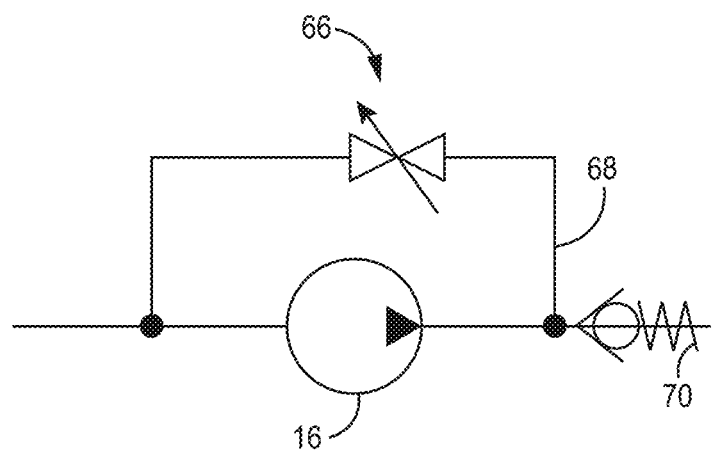
FIG. 14 is a schematic of a positive displacement pump system, according to one implementation.

Various other implementations are possible including use with a side dress fertilizer bar shown further in FIGS. 10, 12 and 13.

Use of positive displacement pumps 16A, 16B close to the discharge 18A, 18B and point of product discharge 19A, 19B allows for product flow rate and pressure to be applied in a controlled manner at each discharge point 19, 19A, 19B to be uniform or otherwise controlled across the width of the toolbar 22, so as to eliminate undesirable variations in discharge rate amongst the various discharges 18A, 18B. It is understood that flow rates within each discharge 18A, 18B and at the point of product discharge 19A, 19B can be the same when that is what is desired. Pressure in the manifold 14, 14A, 14B—or whatever fluidic system is used—would necessarily be different in different locations because of pressure drops along the pipes, but the flow out of the pumps could be the same. Controlled distribution of product pressure across the toolbar 22 is achieved by having a known flow to speed command correlation.

In various implementations, the use of positive displacement pumps 16A, 16B allows for controlled variation in product application rates across the width of the toolbar 22. Different rates for product application can be chosen based on sensor feedback, georeferenced map input, and/or other variables known to those of skill in the art. Additionally, product flow can be varied on a row by row basis to compensate for proper application when driving contoured rows. In implementations with optional flow meters 38, 38A, 38B, the flow meters 38, 38A, 38B may be utilized as part of a closed loop system providing feedback to the system 10. Flow meters 38, 38A, 38B may also be utilized for monitoring and diagnostics.

The system 10 may be retrofitted onto an existing toolbar 22, with or without a prior fluid distribution system. The system 10 reduces the number of parts needed for precise control of fluid at a multitude of points at varying distances from the supply. By reducing the number of parts needed the system 10 is less expensive and has a lower chance of failure.

As shown in FIGS. 5-8, in various implementations the system 10 comprises an optional switching valve system 40. It will be appreciated by the skilled artisan that use of a switching valve 30 according to these implementations permits the intermittent, targeted application of fluid while the system traverses a field, which allows for reduction in the amount of product used while maintaining the same level of effectiveness of the product. The switching valve system 40, can be utilized to strategically, precisely place fluids relative to the seed such that less fluid is used during application. It is further appreciated that this timed application via the switching valve 30 can be timed via interaction with a seed sensor or other timing mechanism understood in the art.

Figure 5:
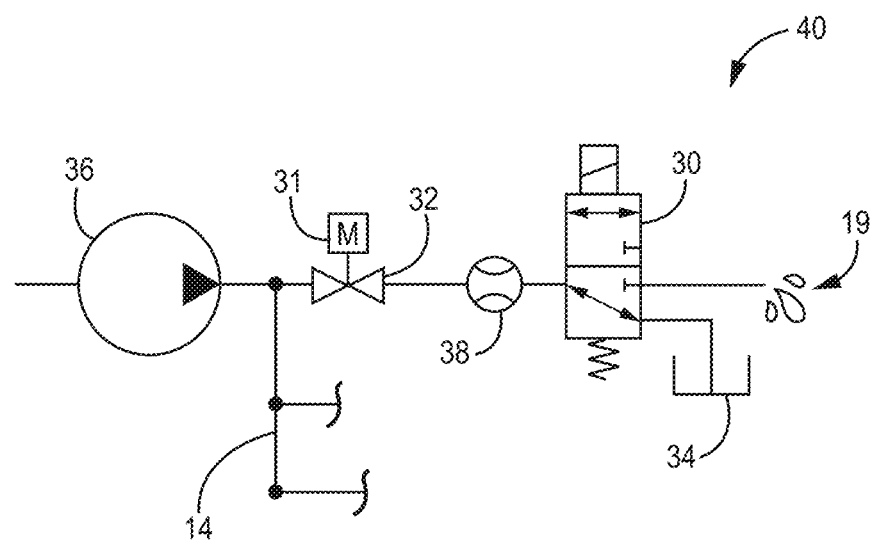
FIG. 5 is a schematic drawing of a switching valve system, according to one implementation.

A switching valve system 40 without the use of a positive displacement pump is shown in the implementation of FIG. 5. The switching valve system 40 according to these implementations has a main system pump 36, which in some implementations has provisions for bypassing unused flow. The main system pump 36 is in fluidic communication with the manifold 14 so as to be capable of pumping fluid/product to the individual rows, as described above.

In these and other implementations, the switching valve system 40 may have a variable opening valve 32, such as a ball valve 32, or other variable opening valve 32 for average flow control on a row. The variable opening valve 32 may be electronically actuated via a closed-loop control system and a motor actuator 31. The main system pump 36 is in fluidic communication with the variable opening valve 32. The variable opening valve 32 is in fluidic communication with a flow meter 38 which is used for control and diagnostics, as described below. The flow meter 38, according to these implementations, is in fluidic communication with a switching valve 30. The switching valve 30 may be a high speed, three way valve 30, or a high speed two way valve 30, while other types of valves are contemplated. The switching valve 30 is in fluidic communication with the point of product discharge 19. The switching valve 30 may also be in fluidic communication with conduits, manifolds, lines and other components of a fluidic system 34 for returning unused fluid/product to the tank (not pictured). It is appreciated that the components of the system may be repeated for each row.

Figure 6:
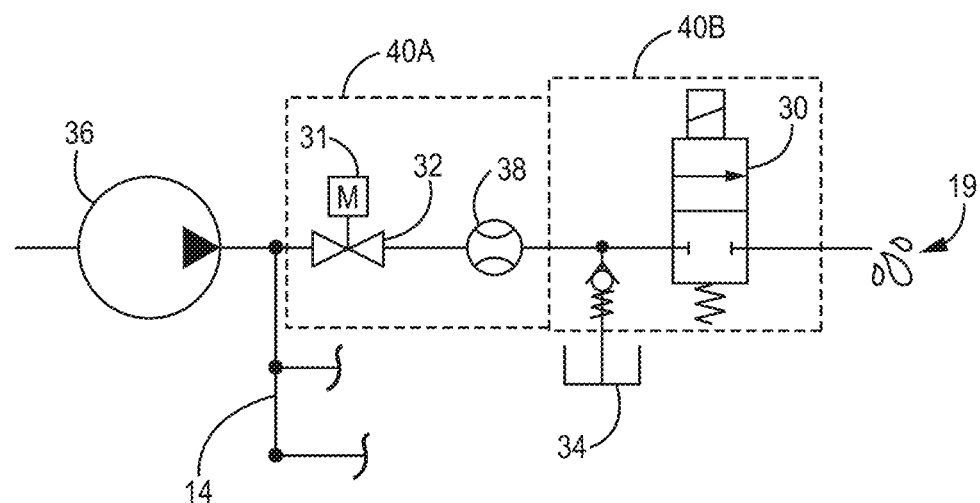
FIG. 6 is a schematic drawing of a switching valve system, according to one implementation.

FIG. 6 depicts an alternate implementation of the switching valve system 40. The switching valve system 40 according to these implementations may be modular, so as to have a modular component 40A and another modular component 40B or more, each of these components 40A, 40B being configured so as to be operably coupleable with one another. In various implementations the main system pump 36 is in the fluidic communication with each row and a variable opening valve 32 on each row.

In these implementations, the variable opening valve 32 is in fluidic communication with a flow meter 38. The variable opening valve 32 according to certain implementations may be electronically actuated with a motor actuator 31 and a closed-control system. The variable opening valve 32, motor actuator 31, and flow meter 38 make up one modular component 40A. The flow meter is in fluidic communication with a second modular component 40B comprising a fluidic system 34 for recirculating unused fluid.

The unused fluid may be recirculated in a plurality of fashions as would be appreciated. The flow meter is in fluidic communication with a switching valve 30. The switching valve 30 may be a high speed, two way valve 30 or high speed, three way valve 30, however it is readily appreciated by one of skill in the art that other valve types are contemplated. The switching valve 30 provides a "pulse" type functionality allowing for an on/off application of fluid. The switching valve 30 is in fluidic communication with the point of product discharge 19.

Figure 7:
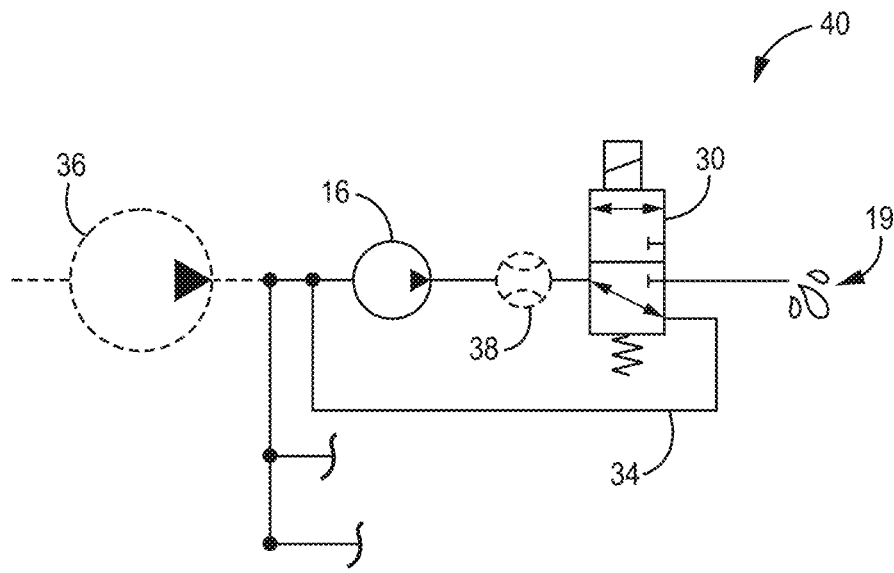
FIG. 7 is a schematic drawing of a switching valve system with positive displacement pump, according to one implementation.

FIG. 7 depicts an alternative implementation of the switching valve system 40. In various implementations the system pump 36 is optional. The system pump 36 and/or tank (not pictured) is in fluidic communication with the switching valve system 40 of each row. The system pump 36 or tank is in fluidic communication with a positive displacement pump 16. The positive displacement pump 16 is in fluidic communication with an optional flow meter 38. In some implementations the flow meter 38 is optional. In implementations without the flow meter 38 the positive displacement pump 16 is in fluidic communication with a switching valve 30. In implementations with a flow meter 38, the flow meter 38 is in fluidic communication with the switching valve 30. The switch valve 30 is in fluidic communication with the point of product discharge 19. The switch valve 30 is also in fluidic communication with a fluidic system 34 for recirculating of unused fluid.

Figure 8:
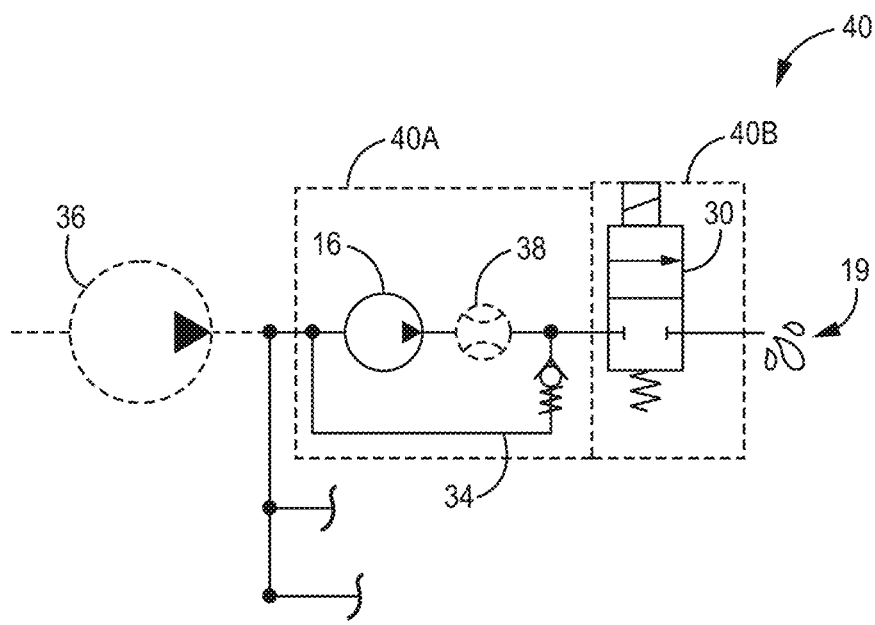
FIG. 8 is a schematic drawing of a switching valve system with positive displacement pump, according to one implementation.

FIG. 8 depicts another implementation of the switching valve system 40. The switching valve system 40 may be modular and consist of at least two modules 40A, 40B. In various implementations, the switching valve system 40 has an optional system pump 36. The switching valve system 40 has a positive displacement pump 16 in fluidic communication with an optional flow meter 38. The positive displacement pump 16 and optional flow meter 38 are in fluidic communication with a pulse valve 30. In some implementations, there are fluidic system 34 components routed from after the positive displacement pump 16 to just before the positive displacement pump 16 for recirculation of unused fluid. The switching valve 30 is in fluidic communication with the point of fluid/product discharge 19.

Shown in FIGS. 9-12 are exemplary implementations of how the switching valve system 40 may be used to strategically and precisely place fluids relative to seed.

Figure 9:
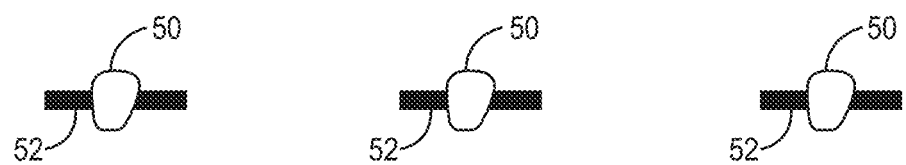
FIG. 9 is a top view of application of fluid to seed, according to one implementation.

Turning to the implementation of FIG. 9, the fluid 52—such as fertilizer—is discharged just before planting of seed 52 and discharge is stopped just after the seed 52. This start-and-stop type placement of fluid 52 allows for the fluid 52 to be placed on and around the seed without wasting fluid 52 on parts of the field that are not in need of the fluid 52.

FIG. 10 depicts an implementation of the system 10 configured for use of the switching pump system 40 with side-dress fluid placement. The system 10 and switching pump system 40 may be configured such that a desired fluid 52—such as nutrient mixtures—can be placed adjacent to the seed 50. It is understood that a desirable aspect of these implementations is that it is possible to apply fluid 52 intermittently, such that the fluid 52 is not placed in the area or space between seeds 50 where the fluid 52 is not needed. This type of controlled placement of fluid 52 conserves fluid 52, thereby reducing both cost and environmental impact.

Figure 11:
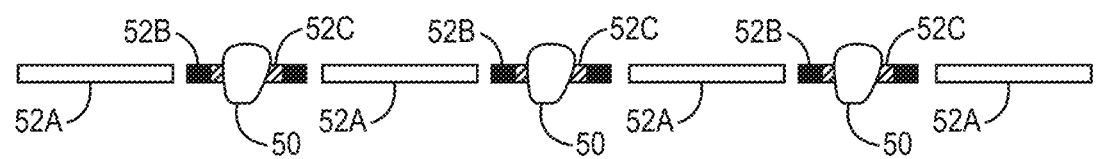
FIG. 11 is a top view of the application of a plurality of fluid to seed, according to one implementation.

The switching pump system 40 used in conjunction with the system 10 or other known systems allows for controlled placement of a variety of fluids 52, 52A, 52B, 52C simultaneously. By way of example, FIG. 11 shows the placement of different fluids 52A, 52B, 52C, such as insecticide/fungicide 52C, fertilizer 52B, side-dress nutrients 52A, while other fluids/products may be used, as would be known to those of skill in the art.

In some implementations the side dress nutrient 52A is placed in-between seeds 50 such that it does not overlap the placement of other fluids 52B and 52C. Fluids such as insecticide/fungicide 52C and fertilizer 52B can be applied in the same area as the seed 50. If more or less insecticide or other fluid 52C is desired it can be discharged such that it covers only the area desired.

FIG. 12 shows fluids 52A, 52B, and 52C being applied around seeds 50 according to another possible configuration. The one fluid 52A may be placed adjacent to the seed 50, rather than in-line with and/or in-between seeds.

The switching valve system 40 and system 10 can also discharge fluid 52 as shown in the implementation of FIG. 13. The fluid 52 may be discharged in such a way as to be intermediate of two rows.

The system 10 and use with the optional switching valve system 40 creates stable and precise rates of control of fluid 52 application. In some implementations unused fluid 52 may be recirculated to reduce waste. The speed of the positive displacement pump(s) 16 can be adjusted based on ground speed. In various other implementations the switching pump system 40 is not present and fluids 52 are applied continuously by the system 10.

The range of flow rates at which a positive displacement pump 16 is accurate can be increased by addition of a bypass line 68 with a restriction 66 or valve 66 of a size for the low end of the flow range of the pump 16. Shown in FIG. 14, the bypass line 68 directs fluid around the positive displacement pump 16. The bypass line 68 is in fluidic communication with a controllable restriction 66 or other valve 66. The controllable restriction 66 may be electronically actuated. Output flow can be reduced below the minimum flow of the pump 16 by opening the restriction/valve 66 to direct some of the output flow back to the pump 16 inlet. The positive displacement pump 16 outlet may have a load 70 to assure the discharge pressure is sufficiently higher than the inlet pressure to cause the fluid in the bypass 68 to flow in the proper direction. In various implementations, the load 70 may be a restriction or a spring loaded check valve.

Figure 15:
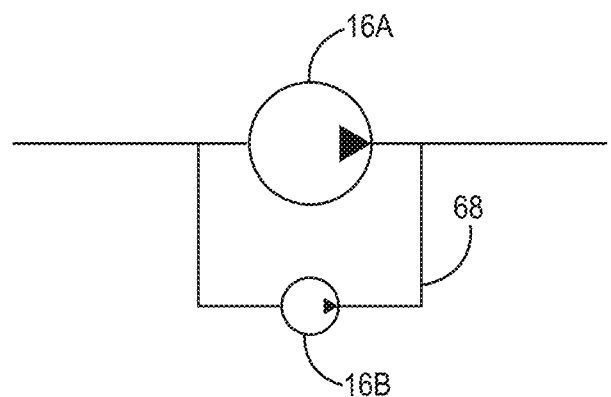
FIG. 15 is a schematic of a positive displacement pump system, according to one implementation.
Figure 16:
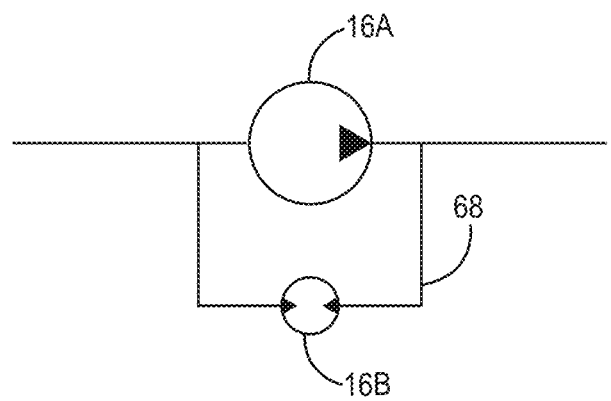
FIG. 16 is a schematic of a positive displacement pump system, according to one implementation.

Flow range can also be extended with the addition of a second smaller positive displacement pump 16B into the system 10, as shown in FIGS. 15 and 16. The smaller positive displacement pump 16B can be single, bi-directional or other pump type known to those of skill in the art.

FIG. 15 depicts a an implementation of the system 10 wherein a positive displacement pump 16A and a second smaller positive displacement pump 16B are in fluidic communication via a bypass line 68. In some implementations, the second positive displacement pump 16B running at its minimum output should meet or be lower than the lowest flow requirements of the system 10. The maximum output of the second positive displacement pump 16B should be greater than or approximately equal to the minimum flow of the first positive displacement pump 16A. Some amount of overlap of the flow rate ranges is desirable. The sum of the maximum output of the first positive displacement pump 16A and second positive displacement pump 16B should be equal to or greater than the maximum flow requirements of the system 10.

In some implementations, the smaller pump 16B is run when the flow requirements are low. If the flow requirement exceeds the maximum output of the smaller pump 16B, the small pump 16B may be shut off and the larger pump 16A used. If the flow requirements exceed the maximum output of the large pump 16A, the large pump 16A and small pump 16B can be used together to increase the flow capacity of the system 10.

In another implementation shown in FIG. 16, the small pump 16B is a bi-directional positive displacement pump 16B. In these implementations, when system 10 flow requirements are low the small pump 16B can be run in the forward direction. According to these implementations, when the system 10 flow requirements exceed the maximum flow of the small pump 16B the large pump 16A can be run at a minimum output while the small pump 16B can be run in reverse, subtracting some flow from the large pump 16A. If the flow requirements exceed the minimum output of the large pump 16A the small pump 16B can be shut off and the large pump 16A run alone. If the flow requirements of the system 10 exceed the maximum output of the large pump 16A the small pump 16B can also be run in the forward direction to increase flow capacity of the system 10.

Figure 17:
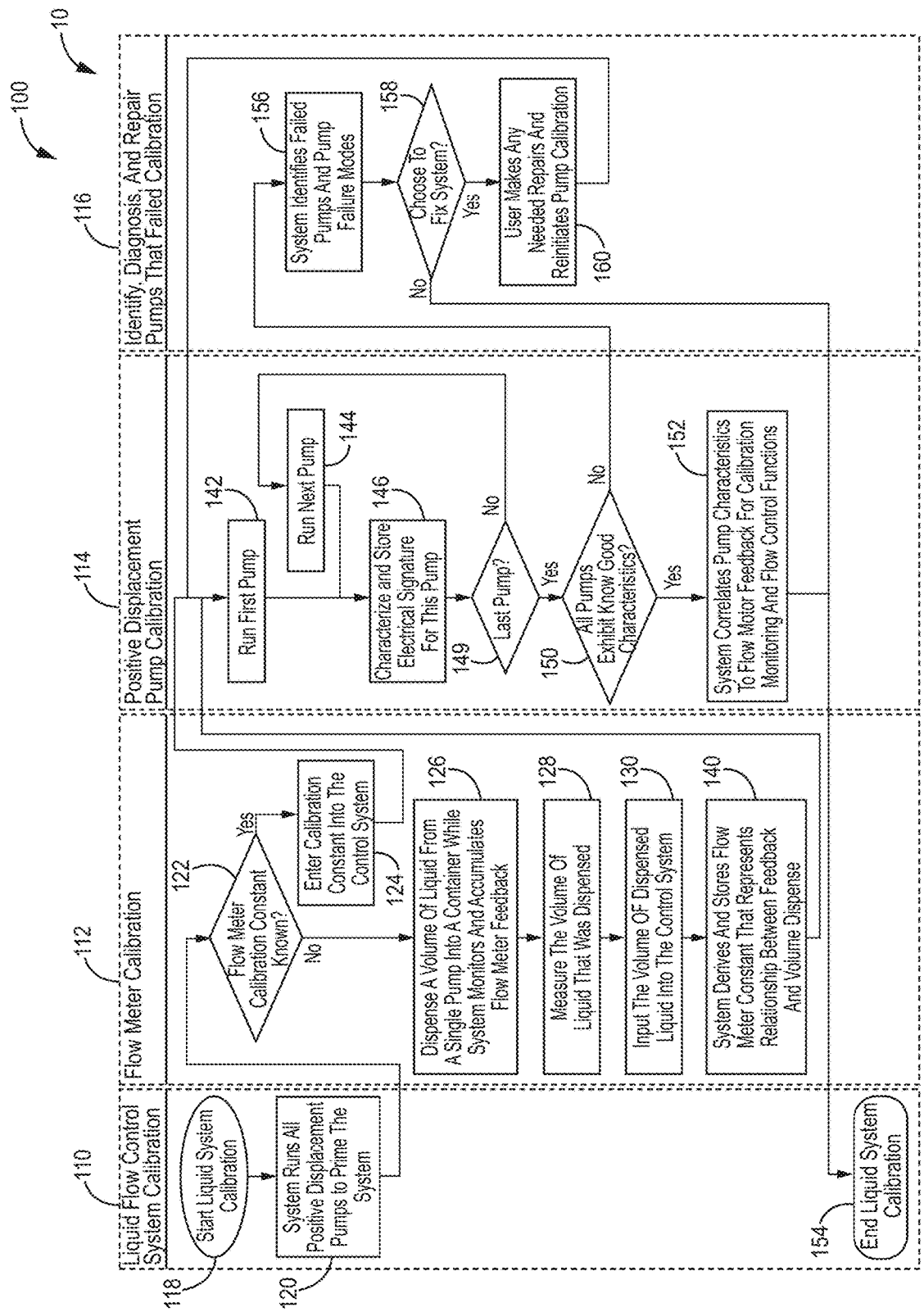
FIG. 17 is a flow chart showing the calibration system, according to one implementation.
Figure 18:
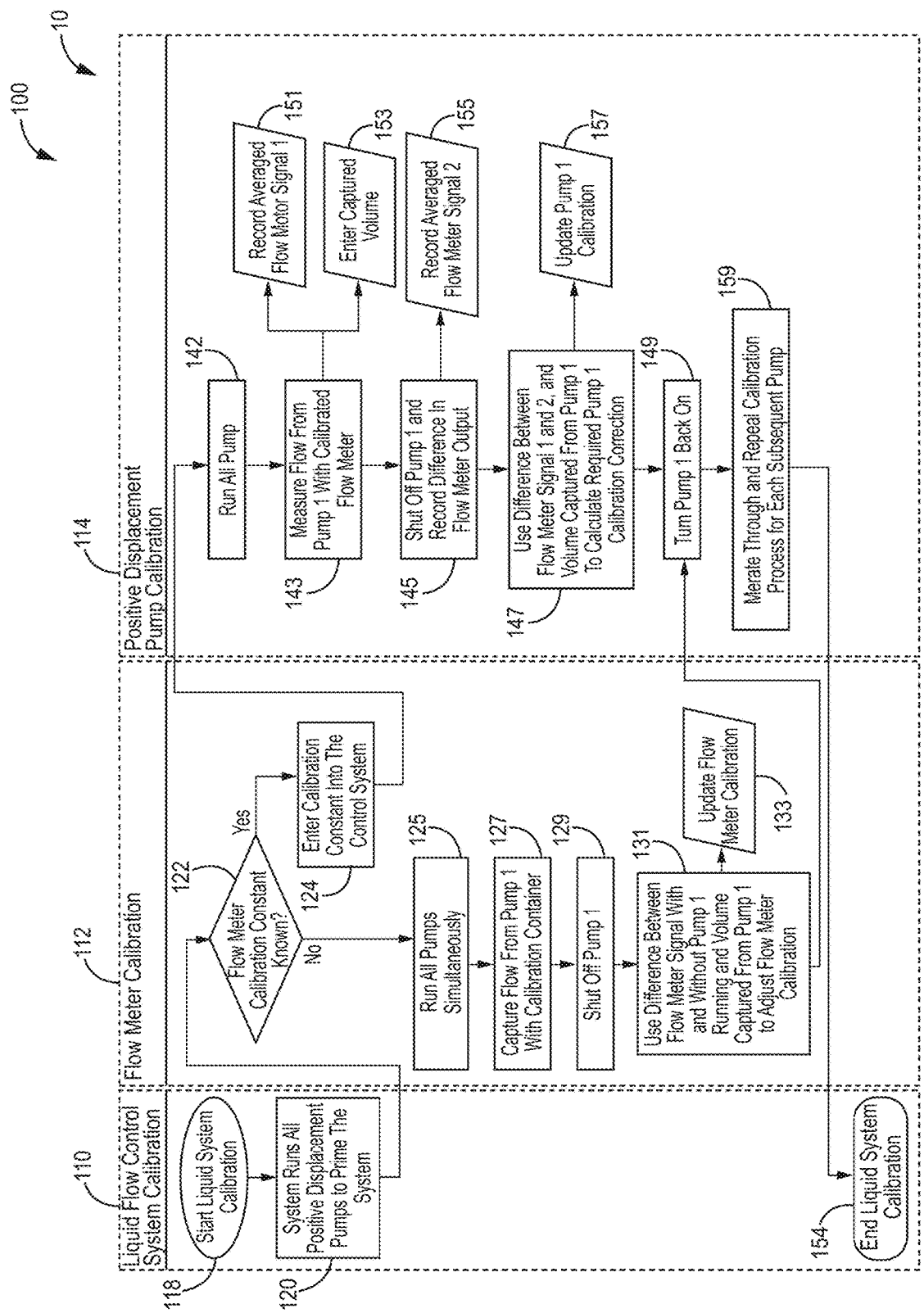
FIG. 18 is a flow chart showing the calibration system, according to one implementation.

Turning to FIGS. 17 and 18, the system 10 may be calibrated via several approaches in various implementations. System calibration may be performed semi-automatically, as is shown in the system 10 of FIG. 17, which has a calibrator 100. In these implementations, it is understood that the flow meter 12 is able to measure the volume of a single pump 16.

By way of example, the system 10 may need to be calibrated for proper application of products having varying physical properties such as density and viscosity. System calibration and monitoring may also alert a user to pump 16 wear and/or damage that could affect product application, reducing down-time and repair cost. In various implementations, system calibration may be performed at the time of initial system installation, as well as at the beginning of a season, and/or at any other time as desired.

Continuing with the implementation of FIG. 17, the calibrator 100 consists of various optional steps that can be performed in any order. The system 10 may perform calibration of the flow control system (box 110), the flow meter (box 112), and/or the positive displacement pump(s) (box 114). The calibrator 100 may also be able to identify, diagnose and repair pumps (box 116).

In some implementations, the calibrator 100 is started (box 118) then the system 10 runs to prime all of the pumps 16 (box 120). Once the system 10 is primed the flow meter 12 may be calibrated (box 112).

The calibrator 100 identifies or asks a user if the calibration constant is known (box 122). If the calibration constant is known the system 10 or user can input the calibration constant into the calibrator 100 (box 124). If the calibration constant is unknown, the system 10 may execute a series of steps to determine the calibration constant.

To determine the calibration constant according to certain implementations, the system 10 dispenses a volume of liquid/product into a container from a single displacement pump 16 while the calibrator 100 monitors and accumulates flow meter 12 feedback (box 126). A user, the system 10, or calibrator 100 may measure the amount/volume of liquid/product that was dispensed (box 128). The amount dispensed may then be entered into the calibrator 100 (box 130). The calibrator 100 then determines the calibration constant from the amount dispensed and flow meter 12 feedback (box 140).

The positive displacement pumps 16 can also be calibrated (box 114) by running a first pump 16 (box 142). The electronic signature for the first pump 16 is stored (box 146). The calibrator 100 continues to run the pumps 16 one at a time (box 144) recording each pump's 16 electronic signature (box 146) until the last pump 16 has been run and signature recorded. It is understood that in various implementations, the electronic signature can comprise at least one of motor voltage, motor current and/or speed, as well as other readings or signatures understood by those of skill in the art. In one exemplary implementation, once the last pump 16 is recorded (box 148), the calibrator determines if each pump 16 has exhibited the proper characteristics (box 150). If every pump 16 has exhibited the proper characteristics then the calibration can end (box 154). If every pump 16 has not exhibited the proper characteristics the malfunctioning pump 16 or pumps 16 must be identified, diagnosed and repaired (box 116). Other approaches are of course possible, as would be understood by those of skill in the art.

The calibrator can identify any pump 16 that is not exhibiting defined characteristics or performing within thresholds (box 156). A user may then decide if the pump 16 needs to be repaired (box 158). If repair is not chosen the calibration ends (box 154). If the pump 16 is repaired (box 160) then the positive displacement pump 16 calibration (box 114), as described above, can be re-run to determine if the repaired pump 16 is now exhibiting the proper defined characteristics and/or performing within thresholds.

In certain implementations, such as that shown in FIG. 18, the flow meter 12 need not be able to measure the volume of a single pump 16. In these implementations, the calibrator 100 is started (box 118) and the system 10 runs all of the displacement pumps to prime the system (box 120). Once the system is primed, the calibrator 100 identifies or asks if the flow meter calibration constant is known (box 122). If the calibration constant is known that value is entered into the calibrator (box 124).

In implementations where the calibration constant is unknown, the calibrator 100 may determine or otherwise establish the calibration constant (boxes 125, 127, 129, 131 and 133). In implementations wherein the flow meter 12 is not sufficiently sensitive to measure the volume of a single pump, the calibrator 100 may run all pumps simultaneously (box 125) to determine the calibration constant. The discharge/product of one of the pumps is collected in a calibrated container (box 127). The pump from which the discharge/product was collected is then shut off (box 129).

In one such exemplary implementation, the calibrator 100 runs all pumps except the one from which the discharge/product was collected, and compares the pre-shut off flow meter signal with the signal after a pump is shut off (box 131). The calibration constant can then be established and entered into the calibrator (box 133). In these implementations, the process of shutting off the pumps individually and in sequence while comparing the flow meter signal changes between when any individual pump is shut off and with the signal when all pumps are running is repeated until all of the pumps have been tested (boxes 149, 159). Once all of the pumps have been tested/calibrated the calibration according to these implementations ends (box 154). Other calibration methods and systems can be applied in alternate implementations.

Continuing with the implementation of FIG. 18, when at least one calibration constant is known (boxes 122, 124) the positive displacement pump calibration (box 114) begins by running all pumps (box 142). The calibrator 100, system 10 or user captures the discharge/product from one of the flow meters (box 143). The calibrator 100 records the average flow meter signal (box 151) and the amount of discharge/product captured is entered into the calibrator 100 (box 153) for use in calibration.

The calibrator 100 according to these implementations continues to calibrate each individual pump by shutting off one of the pumps (box 145) and measuring and recording the difference in flow meter output (box 155). The calibrator 100 uses the recorded difference between flow meter output and volume of product captured to calibrate the pump that was turned off (box 147). The pump is then calibrated and entered into the calibrator and stored (box 157).

The steps above can be repeated, shutting off one pump at a time, until each pump has been calibrated (boxes 149, 159). After each pump has been calibrated or at the desired time the calibration can end (box 154).

The calibration processes of FIG. 17 and FIG. 18 may begin or be resumed and run only for repaired pumps, as would be appreciated by those of skill in the art, in light of the above disclosure. The calibration processes may also be paused at any desired time to allow for repairs to be made. Further implementations are possible.

When a new product is used in the system 10, a prior calibration can be used as a baseline for the calibration of the new product. The system 10 and/or calibrator 100 can monitor flow meter feedback with the new product over one or more intervals to store calibration specific to each product.

The above described calibration processes for use with the system 10 allow for the system 10 to be calibrated using water or any other appropriate substance. The use of water or other substance for the calibration results in less mess and avoids wasted product. Additionally, user effort is minimized with the semi-automated system of FIG. 17 with users only having to capture and measure amounts of discharge/product from one row of the system 10.

The system 10 and calibrator 100 can be implemented with various computers, hardware such as via a processor or PLC, firmware and/or software to automatically derive calibration values and store the values for the user, for example in storage memory or in a database, as would be readily appreciated. The system 10 and calibrator 100 may also be used in conjunction with machine learning to fine tune calibration of different products without any or only minimal effort and/or interaction from a user.

In certain implementations, the calibration system 100 can identify failed pumps 16 while also identifying pumps 16 that are still functioning but not functioning optimally and/or properly. Identification of malfunctioning pumps 16 allows for repair prior to use of the system 10, thereby preventing in-field failures.

In the implementations of FIGS. 17-18, after calibration is complete (box 154), the system 10 utilizes the calibration information to control product application rates and monitor flow control components. The system 10 may be able to identify pump assembly wear, pump assembly failure, fluidic system restrictions, fluidic system leaks, as well as other failures or malfunctions as would be appreciated.

Although the disclosure has been described with reference to preferred implementations, persons skilled in the art will recognize that changes may be made in form and detail without departing from the spirit and scope of the disclosed apparatus, systems and methods.

What is claimed is:

1. A row liquid distribution system for an agricultural implement, comprising:
   a. a supply tank;
   b. a manifold in fluidic communication with the supply tank;
   c. a plurality of discharges; and
   d. a plurality of pumps distributed along the manifold so as to be proximate to the plurality of discharges,
   wherein the system is constructed and arranged to utilize an electronic signature to establish volumetric flow via an open loop system.

2. The system of claim 1, wherein the electronic signature comprises at least one of current applied to the plurality of pumps, voltage applied to the plurality of pumps, displacement of the plurality of pumps, volumetric efficiency of the plurality of pumps, viscosity of an applied liquid, or pump rotational speed.

3. The system of claim 1, further comprising:
   a. a second supply tank;
   b. a second manifold in fluidic communication with the second supply tank;
   c. a plurality of second discharges; and
   d. a plurality of second pumps distributed along the second manifold so as to be proximate to the plurality of second discharges,
   wherein the plurality of pumps distributed along the manifold and plurality of second pumps distributed along the second manifold are variable speed positive displacement pumps.

4. The system of claim 1, further comprising a switching valve system constructed and arranged for intermittent application of fluid.

5. The system of claim 1, further comprising a calibration system.

6. A fluid distribution system for an agricultural implement, comprising:
   a. a tool bar;
   b. a manifold disposed along the tool bar;
   c. a plurality of pumps in fluidic communication with the manifold; and
   d. a plurality of discharges, each discharge in fluidic communication with a corresponding one of the plurality of pumps,
   wherein:
   i. each pump is proximal to the discharge, and
   ii. the system is constructed and arranged to utilize an electronic signature to establish volumetric flow via an open loop system.

7. The system of claim 6, wherein the plurality of pumps are positive displacement pumps.

8. The system of claim 7, further comprising a switching valve system constructed and arranged for intermittent application of fluid.

9. The system of claim 8, wherein the valve system comprises:
   a. a plurality of valves, each valve in fluidic communication with a corresponding one of the positive displacement pumps; and
   b. a recirculation circuit,
   wherein the recirculation circuit recirculates unused fluid back to the positive displacement pumps.

10. The system of claim 9, wherein the plurality of valves are high speed two way valves.

11. The system of claim 9, wherein the plurality of valves are high speed three way valves.

12. A fluid distribution system comprising:
   a. a supply tank;
   b. a manifold;
   c. a plurality of discharges, each discharge defining a row;

d. a plurality of fluid control devices disposed along the manifold, each fluid control device proximal to a point of product discharge wherein the system is constructed and arranged to utilize an electronic signature to establish volumetric flow via an open loop system.

13. The system of claim 12, wherein the fluid control devices are selected from the group consisting of variable opening valves, variable restriction valves, positive displacement pumps and ball valves.

14. The system of claim 13, wherein positive displacement pump speed is adjustable based on ground speed, turning radius and application rate.

15. The system of claim 12, further comprising a valve system constructed and arranged for intermittent application of fluids.

16. The system of claim 15, wherein the valve system is modular.

* * * * *